INVENTORS
WILHELM KIRCHNER
WILHELM OLIVIER

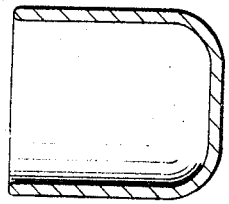
FIG. 10
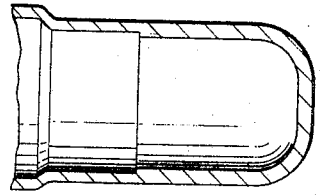
FIG. 11
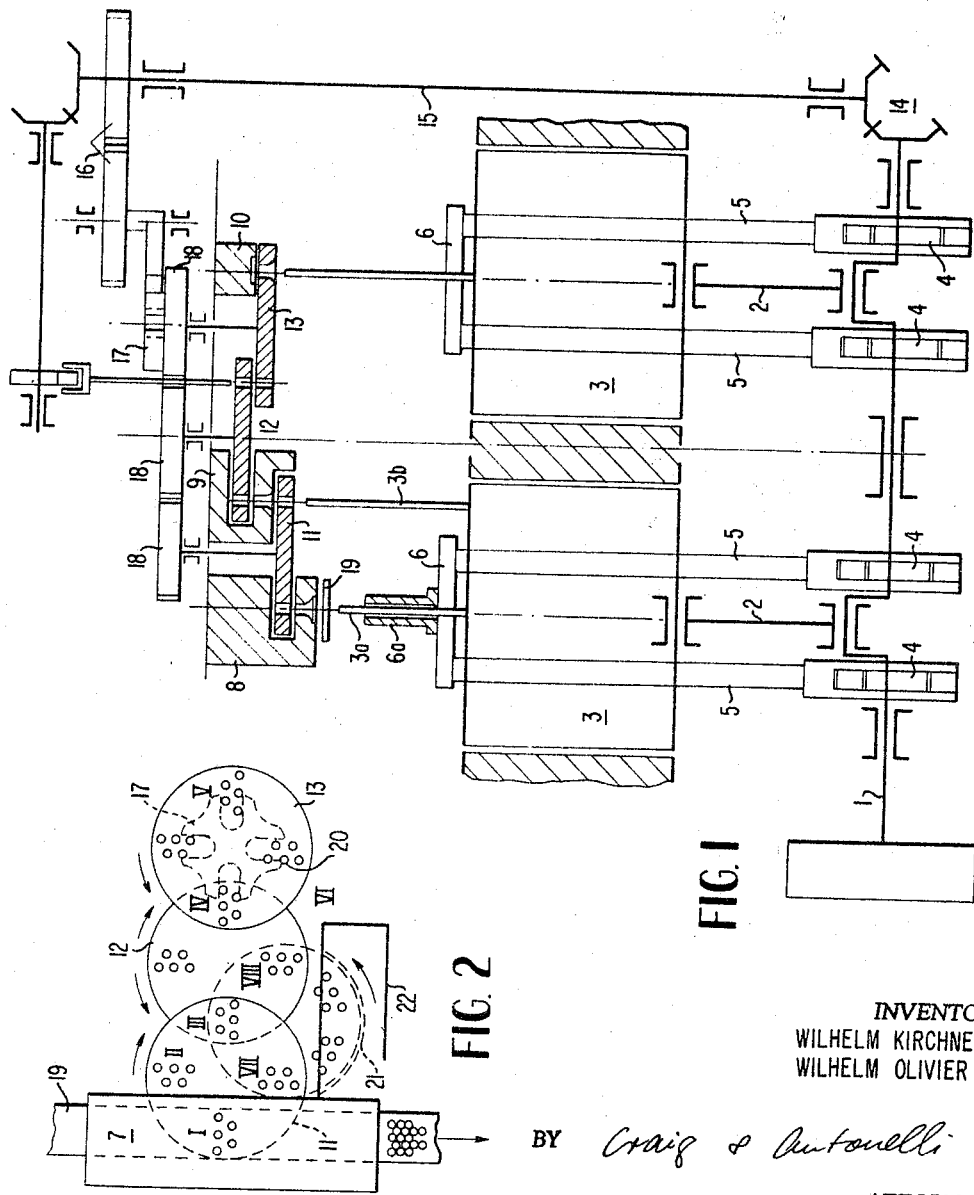
FIG. 1
FIG. 2
INVENTORS
WILHELM KIRCHNER
WILHELM OLIVIER
BY Craig & Antonelli
ATTORNEYS

BY

ATTORNEYS

INVENTORS
WILHELM KIRCHNER
WILHELM OLIVIER

BY Craig & Antonelli

ATTORNEYS

United States Patent Office 3,452,578
Patented July 1, 1969

3,452,578
PROCESS AND APPARATUS FOR MANUFACTURING UNILATERALLY CLOSED CASES WITH A BOTTOM FOLD
Wilhelm Kirchner and Wilhelm Olivier, Nuremberg, Germany, assignors to Dynamit Nobel Aktiengesellschaft, Troisdorf, Germany
Filed Sept. 21, 1967, Ser. No. 669,617
Int. Cl. B21d 22/20, 51/54; B23p 15/22
U.S. Cl. 72—348
14 Claims

ABSTRACT OF THE DISCLOSURE

A process for manufacturing rim firing cartridge cases and an apparatus for the same wherein blanks are continuously punched out of a strip of sheet material and drawn into cup-shaped cases in a single operation. The cases are drawn in such a manner that the open end has a portion of larger diameter that is severed with an axially extending annular cut. The closed end is swaged to produce the annular radially outwardly projecting bottom fold. A plurality of radially overlapping turntables receive and transport the cases from and between, respectively, the devices employed for punching, drawing, cutting and swaging.

Background of the invention

Heretofore, the production of cup-shaped cases, particularly rim firing cases or primer caps for small caliber ammunition, has been carried out in several operating stages, each of which are performed at a separate device. Between each individual device, the caps must be cleaned and it is considerably difficult to transport the caps from one device to another with the result that the devices are frequently jammed by means of improperly transported caps or cases.

Also, it has been proposed to join the cases by means of holding webs between the circular cutouts during transport of the cases from one tool to another, with the exception of the last operating step, namely the heading. The webs are only severed after the required shaping steps have been performed. Such a process eliminates some of the disadvantages mentioned above but has the additional disadvantage that a relatively high consumption of material is the undesirable result. Also, there is a disadvantage that a separate apparatus is provided for the heading process or for forming the bottom fold so that it is necessary to feed the individual cases to the separate apparatus, which will produce the above-mentioned transport disadvantages.

Summary of the invention

It is an object of the present invention to avoid the above-mentioned difficulties by continuously punching plate-like blanks from a flat continuous strip of material and drawing them into cup-shaped cases in the same operating step and, if desired, also additionally in one or several further operating drawing steps. The open end of the case is formed with an enlarged annular portion that is subsequently severed by means of an axially extending annular cut to form a uniform open end. The cases are axially swaged or compressed to produce the bottom fold.

In such a process, there is no necessity for cleaning the cases between the operating steps and there is no loose individual feeding of the cases between the devices, while at the same time a great saving in material is obtained since the plates are punched out in exactly the prescribed size without additional material being employed for connecting web portions.

It is particularly desirable to cut the enlarged portion of the open end of the case by means of an annular axially extending cut that will produce not only a very clean and smooth severance, but also a long lifetime for the cutting tool, which is in contrast to the conventional pinching off operation employed in the industry.

The apparatus employed for the process of the present invention includes a power press having punching, drawing, cutting and swaging tools reciprocable parallel with respect to each other and for cooperation, respectively, with several stationary tool dies. The cases are received by turntables that conduct them from one cooperating set of device and tool die to another cooperating set of device and tool die.

It is particularly advantageous to perform the cutting or punching step by means of a cutting sleeve reciprocable with respect to a cutting die over a short stroke and including a drawing tool relatively reciprocal with respect to and mounted concentrically within the cutting sleeve for movement over a longer stroke to cooperate with a drawing die positioned outwardly, with respect to the strip, of the cutting die.

Further objects, features and advantages of the present invention will become more clear from the following detailed description of the drawing.

Brief description of the invention

FIGURE 1 schematically and partially in section illustrates a top view of the apparatus for conducting the process of the present invention;

FIGURE 2 is a partial cross-sectional view of the apparatus;

FIGURES 10–13 show the various operating stages of the case in each of the operating devices.

Detailed description of the invention

Figure 3:
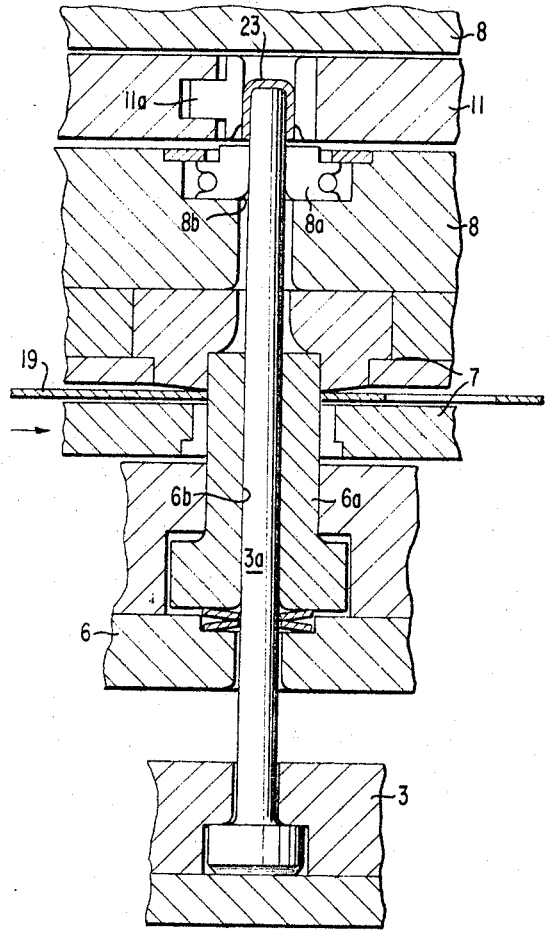
FIGURES 3–9 illustrate in enlarged details and in section the various operating steps and the devices employed therefor.

As shown in FIGURE 1, a single common crankshaft 1 is provided with a plurality of connecting rods 2, for reciprocating the plungers 3, respectively. Eccentric cam-type cranks 4 are employed for reciprocating the auxiliary pistons or plungers 6 connected thereto by the push rods 5. In the present preferred embodiment, only the left auxiliary plunger is operated.

A conventional feeding device 7, forming no part of the present invention, is shown in FIGURE 2 for conveying the metal strip 19 to the tool stock 8. In the stationary tool stock 8, plate-like blanks are punched out of the strip 19 for the compound motion of the plungers 3 and 6 and immediately drawn into small cup-shaped cases. The turntable II thereafter feeds these cases to the tool stock 9 where they are drawn into a further cup shape. The intermediate or idler turntable 12 merely transports the cases from the tool stock 9 to the turntable 13, which in turn transports the cases to the tool stock 10 where they are axially compressed or swaged and subsequently ejected at 20 (FIGURE 2).

The turntables 11, 12 and 13 are intermittently commonly driven by the crankshaft 1 through the bevel gears 14, the shaft 15, the spur gears 16, and the sector-spur gear 17. The turntables have parallel axes and are commonly driven through their inter-engaged gears 18.

As shown in FIGURE 2, the strip 19 is fed by means of the schematically indicated, but conventional feeding device 7, in the direction of the arrow past the tool stock 8 (not shown in the figure). The direction of rotation of each of the turntables 11, 12 and 13 is shown in FIGURE 2 by means of the arrows. A further turntable 21 may be provided if the cups or cases are to be annealed during their passage between the turntables 11 and 12 for cooperating with the annealing chamber 22. With the annealing process included, the cases are fed from the turntable 11, to the turntable 21, thereafter to the turntable 12, and finally to the turntable 13. If necessary, it is also contemplated that an additional turntable and/or station may be provided for a washing process between any of the previously indicated process points or stations. FIGURE 2 also illustrates that five operations may be simultaneously accomplished at each station, that is five blanks may be simultaneously cut, while five blanks are simultaneously swaged, etc.

The stations 1–6 that are illustrated in FIGURE 2, are shown in FIGURES 3–8 on an enlarged scale in greater detail.

FIGURE 3 illustrates the apparatus employed and the method accomplished at station 1, wherein a plunger 3 has attached drivingly thereto a drawing tool 3a and the auxiliary plunger 6 is drivingly attached to the punching tool 6a. The drawing tool 3a is guided within the central bore 6b of the punching tool 6a, which is constructed as a cutting sleeve. The conventional feeding device 7 is only partially shown, because it is known per se and feeds the metallic strip material 19. The tool stock 8 cooperates with the drawing and punching tools and receives therein the turntable 11.

When the crankshaft 1 is set into motion, the auxiliary plunger 6 is first reciprocated with the punching tool 6a to punch or cut out a blank from the strip 19. The drawing tool 3a then advances out of and moves relative with respect to the cutting sleeve 6a to draw the blank through a drawing die in the tool stock 8 into a cup-shaped case. The cutting and drawing is performed in a single operating step along with further movement of the drawing tool 3a to push the case into the aligned aperture of the turntable 11, where it is held by the resiliently urged clamping jaws 11a. In order to insure satisfactory removal of the thus drawn cup-shaped case 23 from the drawing tool 3a, stripping jaws 8a are resiliently spring urged transversely into engagement with the drawing tool 3a and are mounted within the tool stock 8. These stripping jaws 8a have at their axial end adjacent to the strip cam-like surfaces for spreading them apart and allowing passage therethrough of the drawing tool 3a carrying the case 23 during its upward movement (with respect to FIGURE 3). The cam-like surfaces are illustrated at 8b and axially opposite from them are stripping surfaces that will axially abut with the case during withdrawal or downward movement of the drawing tool 3a to strip the case 23 from the drawing tool 3a so that the case 23 is left within the turntable 11.

The above-described procedure is continuously repeated with each full rotation of the crank shaft 1. According to a prescribed automatic operation, the turntable 11 is intermittently rotated by means of the bevel gears 14, the shaft 15, the spur gears 16, and the gear unit 17, through a given angle, for example 90° as illustrated in FIGURE 2, to conduct the cases between the punching and drawing station I and the drawing station II as shown in FIGURE 2.

Figure 4:
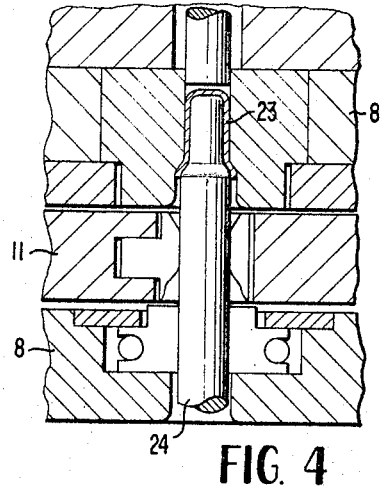
Figure 5:
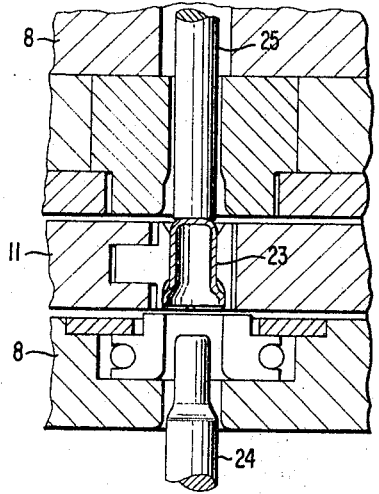

The processes and apparatus used for station II of FIGURE 2 are shown in FIGURES 4 and 5.

After rotation of the turntable 11 to bring the cup 23 to the next station II, that is, through the angle of 90°, a further drawing tool 24 driven by the left-hand plunger 3 (the drawing tool 24 not being shown in FIGURE 1) is moved upwardly to drive the case 23 into the tool stock 8 and through the drawing die to further shape the case 23. At the same station, the plunger 25 thereafter moves the thus drawn case 23 out of the drawing die and back into the turntable 11, as shown in FIGURE 5. It is contemplated that this process may be performed in the tool stock 9, instead of the tool stock 8. The gripping and stripping jaws are substantially the same as previously described.

Figure 6:
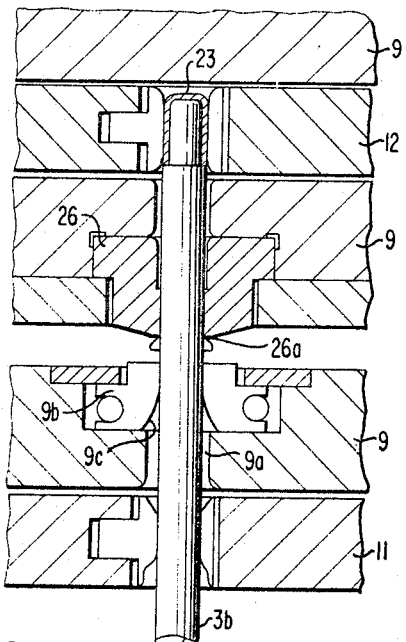

After a further rotation of the turntable 11 through an additional 90°, the case arrives at station III as shown in FIGURE 2, with the procedure conducted thereat and apparatus illustrated in FIGURE 6.

As shown in FIGURE 6, the tool 3b drivingly mounted to the left hand plunger of the two plungers 3 (FIGURE 1), moves the case 23 upwardly with respect to FIGURE 6, out of the turntable 11 and into the tool stock 9. The case is first moved through a large bore 9a and the resiliently urged stripping jaws 9b having the previously described cam-type surfaces 9c so that the relatively large diameter annular portion at the open end of the case, which was formed by the lower portion of the drawing die in FIGURES 4 and 5, will be able to move therethrough without hindrance. Upon further upward movement of the tool 3b, the small diameter portion of the case 23 that is held by the reduced diameter outer portion of the cutting tool 3b, is moved through the cutting die 26. During this insertion through the cutting die 26, the annular relatively large diameter outer end portion of the case 23 is sheared off by means of the cutting edge 26a of the cutting tool 26 and the enlarged diameter portion of the tool 3b. Upon further movement of the tool 3b, the case 23 is moved into the turntable 12 where it is held as previously described; stripper jaws may also be employed with the apparatus of FIGURE 6 to prevent the tool 3b from drawing the cap 23 out of the turntable 12. After withdrawal of the tool 3b, the turntable 12 is rotated in the direction of the arrow of FIGURE 2. The power press is preferably arranged for reciprocation of the tools in the horizontal direction (the vertical direction is shown in the drawings merely for purposes of illustration) so that the severed end of the case will fall downwardly upon retraction of the tool 3b. However, it may be desirable to provide the stripping jaws 9b and/or a flushing step to insure that the severed ends will be discharged and not interfere with subsequent operations.

Figure 7:
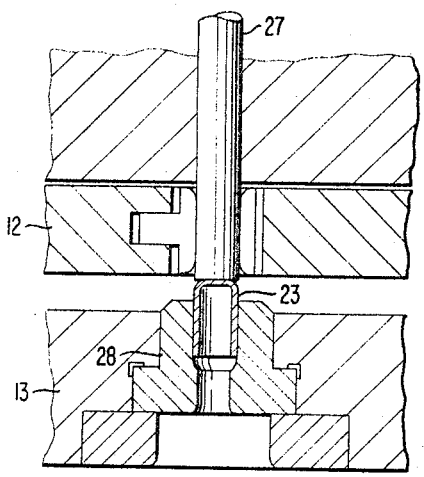

The procedure and apparatus at station IV of FIGURE 2 are shown in FIGURE 7. The case 23 is pushed from the turntable 12 into the turntable 13 by means of the transfer plunger 27, which is also driven by the crankshaft 1 in synchronization with the other elements. During this transfer step, the die 28 forms the open end of the case 23.

Figure 8:
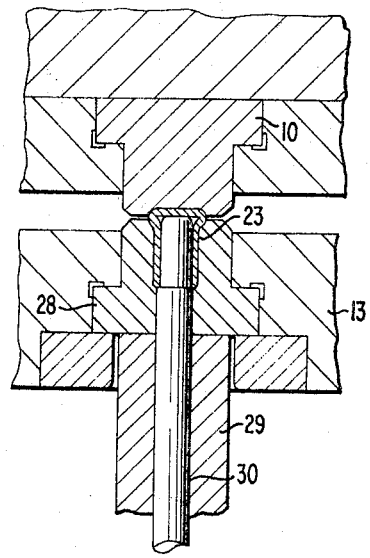

Thereafter, the turntable 13 is rotated in the direction of the arrow of FIGURE 2 to transport the case 23 to the station V, where it is thereafter formed by the apparatus and according to the method illustrated in FIGURE 8.

According to FIGURE 8, the plunger 30, which is drivingly mounted on the right hand plunger of the two plungers 3 of FIGURE 1, is guided in the sleeve 29 and first moves into the open end of the case 23 to drive the case 23 against the swaging die 10 to form the annular bottom fold.

Figure 9:
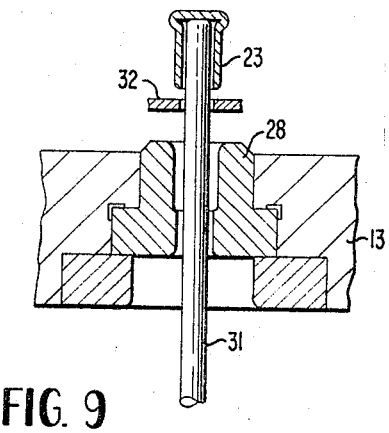

Next, the finished case 23 is further transported by rotation of the turntable 13, to the station VI of FIGURE 2, where it is ejected at 20. The ejecting step is illustrated in FIGURE 9, where a pin 31 is first moved into the case 23 out of the tool 28 and out of the turntable 13. Before retraction of the pin 31, the stripping plate 32 is pivoted inwardly to prevent the case 23 from being drawn back into the tool 28 during retraction of the pin 31, which would interfere with subsequent operations by interfering with the subsequent insertion of a new case into the tool die 28 according to FIGURE 7. Upon retraction of the pin 31, the finished case 23 will fall by gravity into a collection bin or device.

Figure 12:
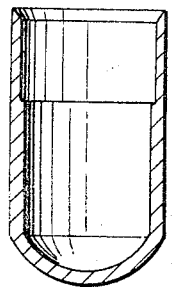
Figure 13:
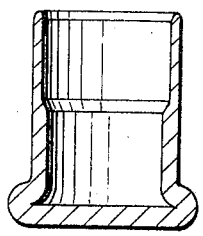

The shape of the case after each of the above-mentioned processes is shown in FIGURES 10–13 on an enlarged scale. The case is in the form of FIGURE 10 after the procedure at station I of FIGURE 2, or the operating process according to FIGURE 3. The shape of the case after its operation at station II of FIGURE 2, or the operation according to FIGURES 4 and 5, is shown in FIGURE 11. The shape of the cap after the operations of station III of FIGURE 2, or the final operating step according to FIGURE 6, is shown in FIGURE 12. The shape of the case after the operation of station V of FIGURE 2, or the process according to FIGURE 8, is shown in FIGURE 13.

It is contemplated that the method and apparatus of the present invention may be employed to produce cases of materially different dimensions and form. Additional operating steps may be required and can easily be performed with slight modifications of the specific illustrated apparatus and fall within the contemplated broader aspects of the present method and apparatus; the turntables may be rotated through angles smaller than the illustrated 90°, for example 72 or 60°. Also, as illustrated in FIGURE 2, a different number of tools may be provided at each station, for example a single tool or a different multiple of tools such as three tools.

For purposes of illustration, a specific preferred method and apparatus for carrying out the method have been illustrated in detail; however, it is contemplated that additional variations, embodiments and modifications of the specifically illustrated preferred method and apparatus may be employed within the spirit and scope of the invention as defined by the following claims.

We claim:

1. A process for the manufacture of cup-shaped cases having an annular radially outwardly projecting bottom fold at the closed end, particularly cartridge cases for rim firing, comprising the steps of: continuously punching plate blanks from a flat strip of sheet material and drawing the blanks into cup-shaped cases having an open end and a closed end in the same operational step; shaping the portion of each case adjacent to the open end into an annular portion of larger diameter than the remaining portions of the case and severing the larger diameter annular portion from the remaining portions of the case; and axially compressing the closed end of each case to form the outwardly projecting bottom fold.

2. The method according to claim 1, wherein said step of severing produces a cut extending in the direction of the case axis.

3. An apparatus for manufacturing cup-shaped cases having an open end and a closed end with a radially outwardly projecting bottom fold, particularly cartridge cases for rim firing, comprising: a reciprocating power press having punching, drawing, cutting and swaging devices reciprocable substantially parallel to each other; a plurality of relatively stationary tool heads for cooperation with each of said devices, respectively; turntable means rotatable substantially transverse to said parallel devices for receiving and positively transporting the cases from one device to another device according to a predetermined prescribed sequence.

4. The apparatus of claim 3 including means for washing and annealing the cases while in the said turntable means between transport from one of said devices to another of said devices.

5. The apparatus of claim 4, including a plurality of drawing devices; said punching device comprising a reciprocable cutter sleeve for cooperation with a stationary cutter die with means for feeding the strip therebetween; at least one of said drawing devices including a drawing tool reciprocable concentrically within said cutter sleeve and a stationary drawing die axially aligned with and outwardly spaced, with respect to said strip, from said cutter stationary die for cooperation with said drawing tool.

6. The apparatus of claim 5, including power means for driving all of said devices and having a common crankshaft.

7. The apparatus of claim 6, wherein said turntable means include a plurality of rotatable turntables intergeared for simultaneous stepwise movement; said turntables being rotatable about substantially parallel axes and radially overlapping with respect to each other.

8. The apparatus of claim 7, wherein at least two of said turntables radially overlap each other in axial space relationship; at least one of said drawing devices including a stationary drawing die positioned between said two overlapping turntables and a drawing tool reciprocable to move a case out of one of said two turntables through said stationary drawing die and into the other of said two turntables.

9. The apparatus of claim 8, wherein each of said turntables includes an aperture opening in the axial direction of its pivotal axis for receiving therein a case; a plurality of stripping fingers resiliently urged transversely into said aperture; each of said fingers having cam means at its axial end facing the cooperating one of said devices for spreading apart and allowing passage therethrough of the associated device carrying the case and having at its opposite end axial abutment surface means for resiliently snapping tightly against the associated device after the passage of said case and axially abutting the case to strip the case from the associated device upon return movement of the associated device out of said aperture.

10. The apparatus of claim 3, including a plurality of drawing devices; said punching device comprising a reciprocable cutter sleeve for cooperation with a stationary cutter die with means for feeding the strip therebetween; at least one of said drawing devices including a drawing tool reciprocable concentrically within said cutter sleeve and a stationary drawing die axially aligned with and outwardly spaced, with respect to said strip, from said cutter stationary die for cooperation with said drawing tool.

11. The apparatus of claim 3, including power means for driving all of said devices and having a common crankshaft.

12. The apparatus of claim 11, wherein said turntable means include a plurality of rotatable turntables intergeared for simultaneous stepwise movement; said turntables being rotatable about substantially parallel axes and radially overlapping with respect to each other.

13. The apparatus of claim 12, wherein at least two of said turntables radially overlap each other in axial space relationship; at least one of said drawing devices including a stationary drawing die positioned between said two overlapping turntables and a drawing tool reciprocable to move a case out of one of said two turntables through said stationary drawing die and into the other of said two turntables.

14. The apparaus of claim 12, wherein each of said turntables includes an aperture opening in the axial direction of its pivotal axis for receiving therein a case; a plurality of stripping fingers resiliently urged transversely into said aperture; each of said fingers having cam means at its axial end facing the cooperating one of said devices for spreading apart and allowing passage therethrough of the associated device carrying the case and having at its opposite end axial abutment surface means for resiliently snapping tightly against the associated device after the passage of said case and axially abutting the case to strip the case from the associated device upon return movement of the associated device out of said aperture.

References Cited

UNITED STATES PATENTS

| 2,264,266 | 11/1941 | Jacobs et al. | 29—1.3 |
| 2,331,870 | 10/1943 | Coxe | 102—43 |
| 3,058,195 | 10/1962 | Ericsson | 29—1.21 |

RONALD D. GREFE, *Primary Examiner.*

U.S. Cl. X.R.

29—1.31, 1.32